United States Patent [19]

Fouss et al.

[11] 4,374,079
[45] Feb. 15, 1983

[54] METHOD AND APPARATUS FOR MANUFACTURING EXPANDED AND LAYERED SEMIROUND PLASTIC TUBINGS

[75] Inventors: James L. Fouss; Larry A. Rosenbaum; James L. Child, Jr., all of Findlay, Ohio

[73] Assignee: Hancor, Inc., Findlay, Ohio

[21] Appl. No.: 240,602

[22] Filed: Mar. 4, 1981

[51] Int. Cl.³ .................... B29D 27/00; B29C 17/07; B29C 17/10
[52] U.S. Cl. .................... 264/46.1; 264/46.9; 264/508; 264/565; 264/155; 264/173; 264/209.3; 264/238; 425/131.1; 425/134; 425/290; 425/326.1; 425/817 C
[58] Field of Search .................... 264/45.9, 171, 46.1, 264/173, 209.3, 238, 155, 46.9, 508, 565; 425/131.1, 134, 326.1, 290, 817 C

[56] References Cited

U.S. PATENT DOCUMENTS

| | | | |
|---|---|---|---|
| 2,994,327 | 8/1961 | Otto et al. | 264/45.9 X |
| 3,391,424 | 2/1968 | Drossbach | 425/290 |
| 3,732,046 | 5/1973 | Martin et al. | 264/209 X |
| 3,819,778 | 6/1974 | Maroschak | 264/238 X |
| 3,843,758 | 10/1974 | Maroschak | 425/303 X |
| 3,910,713 | 10/1975 | Maroschak | 425/290 X |
| 3,990,827 | 11/1976 | Maroschak | 425/150 X |
| 4,112,795 | 9/1978 | de Putter | 425/290 X |
| 4,167,866 | 9/1979 | Ames et al. | 264/171 X |
| 4,182,582 | 1/1980 | Youval et al. | 264/45.9 X |
| 4,226,580 | 10/1980 | Lupke et al. | 425/326.1 X |

FOREIGN PATENT DOCUMENTS

| | | | |
|---|---|---|---|
| 1172035 | 6/1964 | Fed. Rep. of Germany | 264/171 |
| 2375515 | 8/1978 | France | 264/45.9 |

OTHER PUBLICATIONS

Naugatuck Chemical Bulletin, "The Technology of Celogen Blowing Agents Celogen OT" Naugatuck, Conn., U.S. Rubber Co: Naugatuck Chemical Division, Nov. 10, 1975, one page.

Primary Examiner—Philip E. Anderson
Attorney, Agent, or Firm—Fay & Sharpe

[57] ABSTRACT

The specification discloses an apparatus and method for concurrently manufacturing at least two semiround tubing structures. An extruder including plasticizing means for a plurality of plastic resins extrudes semi-round and linear strips of plastic material in generally two back to back D-shaped sleeves. Between the D-shaped sleeves, a strip of adhesively non-compatible material is extruded so that the D-shaped sleeves may be separated. The rounded portions of the D-shaped sleeves are molded in a continuous blow molding arrangement to form the top wall of the semiround tubing. The tubing is cooled, and the two semiround tubing lengths separated from the adhesively non-compatible strip inbetween. Optionally, the base of the semiround tubing may be perforated. The two lengths of semi-round tubing are folded with the base inside the top wall and coiled into large reels.

34 Claims, 8 Drawing Figures

METHOD AND APPARATUS FOR MANUFACTURING EXPANDED AND LAYERED SEMIROUND PLASTIC TUBINGS

BACKGROUND OF THE INVENTION

This application pertains to the art of manufacturing plastic tubing and more particularly to the art of manufacturing semiround plastic tubing, conduit, or pipe. The invention is particularly applicable to corrugated plastic drainage tubing and will be described with particular reference thereto. It will be appreciated, however, that the invention has broader applications, such as manufacturing smooth-walled semiround tubing, expanded plastic semiround tubing, septic and leachbed tubings, subterranean conduit, other fluid conveying channels, pipes for shielding electrical conduit, and the like.

In the past, most corrugated drainage tubing has been circular in cross section. The circular tubing is generally manufactured in a linear production line. A plastic extruding machine fitted with a circular extrusion die receives pellets of polymeric, thermoplastic material and extrudes a plastic sleeve through an extrusion die. The extruder subjects the pellets to a combination of heat and pressure to soften the pellets to a semifluid, plastic state. Closely adjacent the extruder is positioned a continuous blow molding assembly. Conventionally, the blow molding assembly includes pairs of mold blocks arranged in continuous loops. Adjacent the extruding die, each pair of mold blocks abuts together to define the circular corrugated mold. The mold blocks then travel linearly away from the die as the sleeve is forced by pneumatic pressure to conform to the shape of the interior surface of the mold blocks. While the mold blocks of each pair are abutting each other and traveling in contact with the tubing, the plastic material cools sufficiently that it retains its molded shape. The mold blocks then separate and return to their initial position.

After the tubing is molded, it is cooled in a water bath to make the plastic sufficiently hard for slotting or drilling operations. If the tubing is to be used for drainage tubing, the continuous length of tubing is commonly conveyed through a slotting machine which cuts a series of thin slots into the side walls of the tubing. If the tubing is to be used for septic tubing, the tubing is commonly conveyed through a drilling machine which drills round holes about ⅜ of an inch in diameter into the side walls of the tubing. If the tubing is to be used for conveying fluids only, it is neither slotted nor drilled. The plastic tubing is commonly cut at 10 foot lengths or coiled in rolls, such as a 250 foot roll. Numerous patents illustrate the conventional methods for manufacture of corrugated plastic tubing, see for example U.S. Pat. No. 3,732,046, issued May 8, 1973 to R. C. Martin; U.S. Pat. No. 3,819,778, issued June 25, 1974 to E. J. Maroschak; U.S. Pat. No. 3,843,758, issued Oct. 22, 1974 to E. J. Maroschak; and U.S. Pat. No. 3,990,827, issued Nov. 9, 1976 to E. J. Maroschak.

Others have manufactured smooth-walled circular tubing for drainage, septic, and other applications. The smooth-walled tubing has been manufactured of a single plastic material by some and by others with laminated plastic materials. Expanded plastic has been used for the single plastic material and for one or more layers of the laminated tubing. To form laminated tubing, the extruding machine includes an extruder for each plastic material and an extrusion die with concentric outlets. An extruder plasticises each type of plastic material in the laminant. The tooling of the extruder includes channeling means for channeling each type of plastic to one of the concentric outlets of the die. The smooth-walled tubing is similarly cooled and cut in 10 foot lengths. The lengths are slotted or drilled, if their intended application so requires.

The pellets of polymeric material fed to the extruding machine are commonly a blend of polymers which have different properties. A polymer with an advantageous property normally has offsetting disadvantageous properties. Further scrap plastic from drillings, trim, out-of-spec. production, and the like are commonly reprocessed and mixed with virgin plastic pellets. The resultant plastic product has an average of all the advantageous and disadvantageous physical properties. Some of the polymers are chosen for a high structural strength, others for a high impact resistance, still others for a high abrasion resistance, and the like. The blended product will not be as structurally strong as it would if it were composed entirely of the structurally strongest component, nor as abrasion resistant as it would have been if it were composed entirely of the most abrasion resistant component, and the like.

One of the problems with the prior art apparatus and methods for manufacturing corrugated plastic tubing is that only a single length of tubing is manufactured on each production line.

Another problem with the prior art manufacturing techniques is the difficulty encountered when drilling or slotting moving lengths of continuous plastic tubing.

Yet another problem with the prior art manufacturing techniques is the difficulty encountered in trying to optimize the physical properties of the plastic material. Blending a plurality of plastic materials fails to achieve the most advantageous physical properties of any one of the individual components.

The present invention contemplates a new and improved method and apparatus for manufacturing plastic tubing which overcomes the above-referenced problems and others. It provides an apparatus and method for manufacturing plastic tubing which is simpler, more economical and faster than the prior art.

SUMMARY OF THE INVENTION

In accordance with a first aspect of the present invention, there is provided a method and apparatus for manufacturing a plurality of plastic conduits with integral bases in a single assembly line.

In accordance with a more limited aspect of the invention, there is provided an apparatus for manufacturing semiround tubing lengths, which tubing lengths comprising a semiround top wall and an integral base. The apparatus comprises a D-shaped sleeve extrusion means for extruding a first pair of generally D-shaped sleeves formed at least in part of a first polymeric material. An advancing means advances between the D-shaped sleeves a strip of a material which is adhesively non-compatible with the first polymeric material. A separating means separates the generally D-shaped sleeves from the strip of adhesively non-compatible material. The first and second sleeves are lengths of semiround tubing.

In accordance with another aspect of the invention, there is provided a method and apparatus for manufacturing a plurality of at least partially layered plastic tubing lengths in a single assembly line.

In accordance with a more limited aspect of the invention, there is provided an apparatus for concurrently manufacturing at least two semiround tubing lengths. The apparatus comprises a first extrusion means for extruding a first pair of semiround strips of a first polymeric material. A second extrusion means for extrudes a second pair of semiround strips of a second polymeric material. The first and second pairs of semiround strips are extruded substantially parallel and contiguous to each other. The second polymeric material is adhesively compatible with the first polymeric material. A plurality of pairs of mold blocks mold the first and second pairs of semiround strips into layered, semiround top walls of the tubing lengths.

A principle advantage of the invention is that it allows a plurality of tubing structures to be formed on a single assembly line.

Another advantage of the present invention is that it allows the concurrent manufacture of at least two semiround tubing structures with integral bases and top walls. The present invention increases the speed of production and decreases the cost and amount of manufacturing equipment.

Yet another advantage of the present invention is that it produces a semiround tubing structure with a layered top wall to improve the strength of the manufactured tubing. Conversely, the present invention produces semiround tubing of the same strength with less plastic material.

BRIEF DESCRIPTION OF THE FIGURES

The invention may take physical form in certain parts and steps and arrangements of parts or steps, a preferred embodiment of which will be described in detail in the specification and illustrated in the accompanying drawings which form a part hereof.

DESCRIPTION OF THE PREFERRED EMBODIMENT

The present invention is applicable to manufacturing various shapes and styles of tubing. It may be used to manufacture semiround tubing including parabolic, semielliptical, semicircular, and many other geometric cross sections of hollow tubing structures. Semiround connotes a generally rounded inner or outer surface segment which can be closed by a straight line. The generally rounded segment can be an arc or a plurality of arced or linear segments which taken together form a generally rounded construction. In the preferred embodiment, the tubing lengths have an arched cross section, particularly a generally parabolicly arched inner cross section and a generally semielliptically arched outer cross section. Other combinations of cross sections, such as a generally triangular inner cross section and a generally semicircular outer cross section and the like, are contemplated by the present invention.

Figure 2:
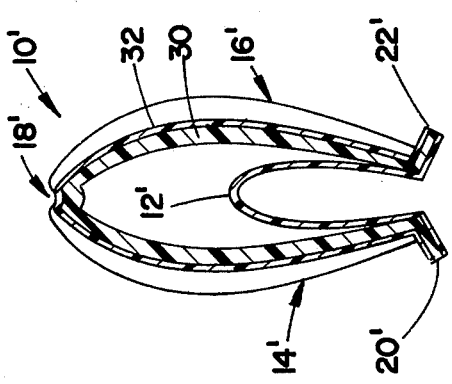
FIG. 2 illustrates a cross section of an alternate embodiment of a tubing structure manufactured in accordance with the present invention in a folded configuration.
Figure 1:
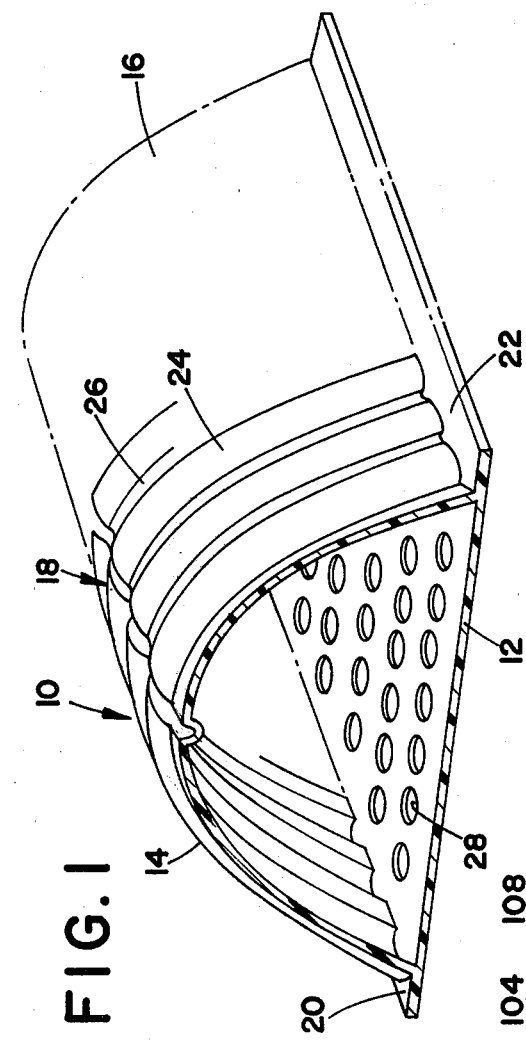
FIG. 1 illustrates a semiround tubing construction with an integral base manufactured in accordance with the method or apparatus of the present invention.

FIGS. 1 and 2 are illustrative of tubing structures which may be manufactured with the present invention. With particular reference to FIG. 1, the tubing length is an elongated conduit comprised of a top wall 10 and a base 12. The top wall 10 includes a pair of cooperatively spaced side walls 14 and 16 which are connected at an apex area by a connecting or hinge means 18. The hinge means 18 enables the side walls 14 and 16 to be folded together thereby longitudinally folding the length of tubing. Nonfoldable tubing is manufactured by eliminating the hinge means. Opposite their interconnection by the hinge means, the side walls terminate in flanges 20 and 22 which extend longitudinally along terminal edge areas. The flanges provide a bearing surface upon which the length of tubing and any supported load, such as backfill, rest. The side walls are formed with a plurality of alternating peaks 24 and valleys 26 to form configurations. Smooth-walled semiround tubing is also contemplated to be within the scope of the present invention.

Although in the embodiment of FIG. 1 the base 12 is integrally formed with the top wall 10, it is thinner so as to be relatively flexible. This enables the base to be folded between the side walls when the tubing is folded, note FIG. 2. If the tubing is to carry fluids, the base may be solid. If the tubing is to function as drainage or septic tubing or other applications in which fluid is allowed to enter or exit from the tubing, the base is perforated with apertures 28, such as slits or holes. Alternately, the apertures may be pores in the plastic material forming the base. When the tubing is installed in a subterranean location, the base 12 rests on the floor of the trench or other earth or surface. In this manner, the base is supported by the earth. Accordingly, it need not be constructed sufficiently rigid or strong to support the conveyed fluids by itself. However, under distributed vertical loading from backfill, the semiround tubing tends to flatten. To counter any flattening, the base 12 is strong enough to resist forces that tend to move flanges 20 and 22 apart.

The tubing may be formed from various polymeric materials such as polyethylene, ABS, styrene polymers, polyvinyl chloride, or the like. Further the tubing may be formed of expanded polymeric materials. The height of the corrugations, the thickness of the plastic, the contour of the corrugations, the cross section of the top wall, and the like are chosen such that when the tubing is installed in a subterranean installation, there is sufficient strength to withstand loading forces from backfill and hydraulic loading from ground water. In the preferred embodiment, the top wall has an interior cross section which is substantially a parabolic arch and an exterior cross section which is generally a semielliptical arch. If the tubing is smooth-walled, it is preferred that the polymeric material be expanded and that the top wall has a parabolic internal cross section and a semielliptical external cross section.

FIG. 2 is illustrative of an alternate embodiment of the tubing structure set forth in FIG. 1 shown in its folded configuration. In the alternate embodiment of FIG. 2, like parts are shown with like reference numerals followed by a prime ('). In the embodiment of FIG. 2, the top wall 10' has an inner layer 30 of a first polymeric material and an outer layer 32 of another polymeric material. In the preferred embodiment, the inner layer is formed of a polymeric material with carbon black filler to provide good structural strength and long-term resistance to ultraviolet degradation. The outer layer 32 is formed of a relatively thin layer of polymeric material which has good light reflectivity and good abrasion and impact resistance. In the preferred embodiment, the inner layer 30 is polyethylene with a relatively high amount of carbon black filler. The outer layer 32 is also polyethylene but with a white pigment to improve its light reflectivity. The light reflective outer layer 32 inhibits the tubing from increasing in temperature when it is exposed to sunlight during installation or storage. An increase in temperature undergone by black tubing tends to soften the plastic material causing a permanent deformation of its shape. The base 12' is carbon black-filled polyethylene material which is attached to at least one flange 20' and 22' by welding, gluing, heatsealing or the like. It may be made of various materials such as MYLAR plastic material, metallic foils, spunbonded fabric, e.g., TYPAR spunbonded polypropylene material, filter or screening materials, and others. Alternately, the base may be integral with inner layer 30 or outer layer 32.

Figure 3:
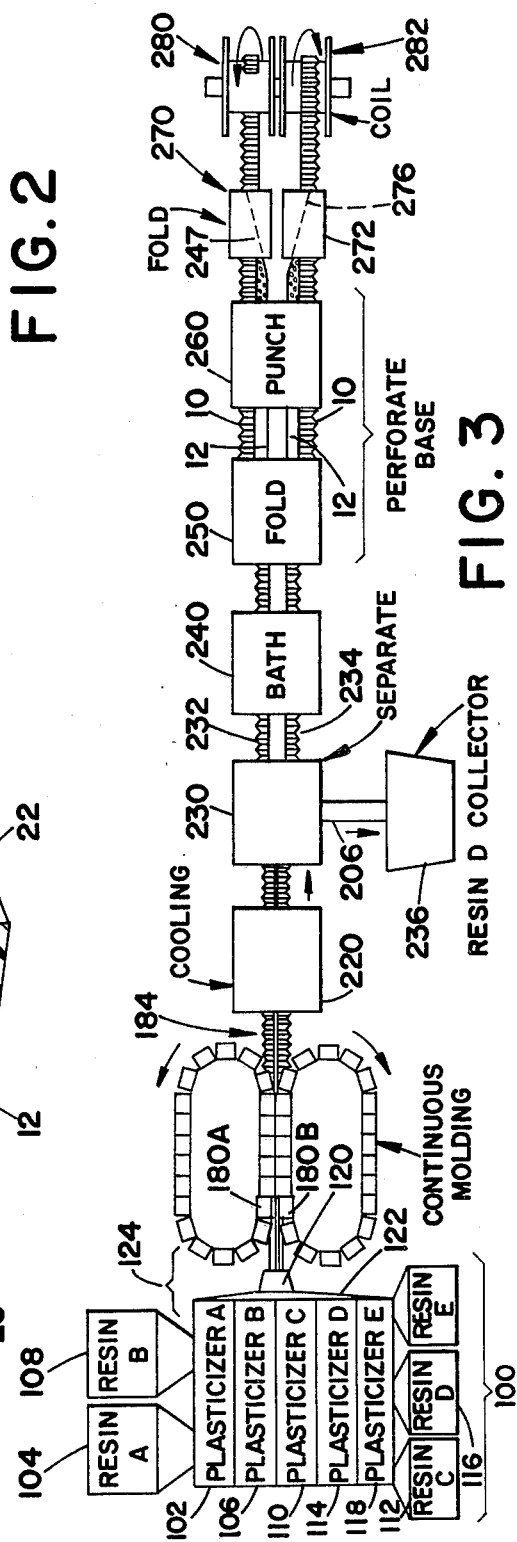
FIG. 3 is a block diagram of the steps or apparatus for manufacturing plastic tubing in accordance with the present invention.

FIG. 3 illustrates an apparatus and method for concurrently producing at least a first and second length of semiround tubing. The first step in the manufacturing process is the extrusion of a pair of generally D-shaped sleeves of plastic or polymeric material separated at their bases by an adhesively non-compatible material. An adhesively non-compatible material contemplates a material to which the polymeric material of the sleeves will not adhere securely. The adhesion should be such that upon cooling, the adhesively non-compatible material may be readily separated from the tubing. When the tubing is constructed of polyethylene, a suitable adhesively non-compatible material is styrene, TEFLON, or the like. The extrusion step is performed with an extruder 100 for concurrently extruding a plurality of strips or sleeves of polymeric material. The extruder 100 includes D-shaped sleeve extrusion means for extruding two or more generally D-shaped sleeves and advancing means for advancing a strip of adhesively non-compatible material between the D-shaped sleeves.

The D-shaped sleeve extrusion means includes a base advancing means for advancing one or more linear strips for forming a base to the lengths of tubing and at least a first or main extrusion means for extruding at least a first or main pair of semiround strips. The D-shaped sleeve extrusion means may also include a second or outer extrusion means for extruding a second or outer pair of semiround strips parallel and contiguous to the first pair or a third or inner extrusion means for extruding a third or inner pair of semiround strips parallel and contiguous to the first pair. The first extension means includes a first plastizing means 102 which receives pellets of a first polymeric material or plastic resin from a first resin hopper 104 for supplying sufficient heat and pressure to plasticize the first polymeric material. The first polymeric material, in the preferred embodiment, is polyethylene with carbon black filler. Optionally, the first polymeric material may be mixed with an additive to expand the plastic such as CELOGEN. The CELOGEN additive expands the polymeric material by forming small nitrogen bubbles as the plastic leaves the extrusion die. The second semiround strip extension means of the D-shaped sleeve extrusion means includes a second plasticizing means 106 which receives a second polymeric material or plastic resin from a second hopper 108. The second polymeric material, in the preferred embodiment, is white polyethylene. The third semiround strip extension means includes a third plasticizing means 110 receives a third polymeric material or plastic resin from a third hopper 112. The third polymeric material, in the preferred embodiment, is reprocessed polyethylene with carbon block filler. The base advancing means in the preferred embodiment extrudes a pair of generally linear strips. The base extrusion means includes a fourth plasticizing means 114 which plasticizes a base polymeric material or plastic resin from a resin hopper 116. In the preferred embodiment, the base polymeric material is polyethylene with carbon block filler. The non-compatible material advancing means includes a fifth plasticizing means 118 which plasticizes a polymeric material which is adhesively non-compatible with polyethylene and which is received from a fifth resin hopper. The adhesively non-compatible polymeric material, in a preferred embodiment, is styrene.

The plasticized materials are conveyed to an extrusion die 120 from which the plastic material is extruded. A channeling means 122 channels the polymers from the plasticizing means to the appropriate parts or apertures in the extrusion die 120. Commonly, the channeling means includes valving means, which is known in the art, for regulating the flow rate between the plasticizers and the various apertures or parts of apertures in the extrusion die. Taken together, the valving means, the channeling means 122, the extrusion die 120 and other associated parts are denoted as a tooling 124.

Figure 4:
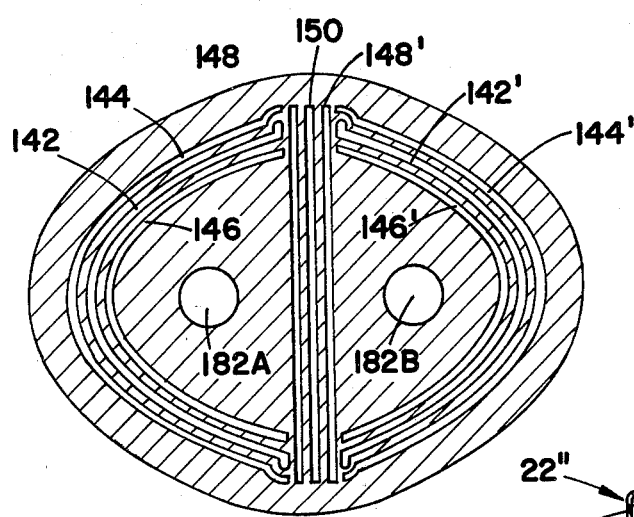
FIG. 4 is a sectional view of an extrusion die of FIG. 3 through section line 4—4.

FIG. 4 illustrates a sectional view of extrusion die 120 taken closely adjacent its exit end. The first semiround strip extrusion means further includes semiround apertures 142 and 142' of the extrusion die and the channelling which connects these apertures with the first plasticizer 102. The second semiround strip extrusion means further includes semiround apertures 144 and 144' of the extrusion die and the channelling which connects these apertures with the second plasticizer 106. The third semiround strip extrusion means further includes semiround aperture 146 and 146' and the channelling which connects these apertures with the third plasticizer 110. The base extrusion means further includes the linear apertures 148 and 148' and the channelling which connects the linear apertures with the plasticizer 114.

When the linear base strips and the first, second or third pairs of semiround strips are to be formed of the same polymeric material, the base extrusion means and the first, second, or third semiround strip extrusion means, can share a common plasticizer. Similarly, when two or more of the pairs of semiround strips are to be extruded of the same polymeric material, the corresponding semiround strip extrusion means can share a common plasticizer. This promotes economy of operation by reducing the number of plasticizers. Further when the base strip and one or more of the semiround strips are to be extruded of the same material, the linear apertures 148 and 148' can be integral with the corresponding semiround aperture.

The non-compatible strip advancing means includes a linear aperture 150 disposed parallel to and between the linear aperture 148 and 148' and the channelling which connects it to the plasticizer 118.

Rather than extruding the strip of adhesively non-compatible material, an endless belt of preformed adhesively non-compatible material may be fed or advanced through aperture 150 of the extrusion die. Further the strip of adhesively non-compatible material may be a fluid which does not solidify in the manufacturing process. Similarly, rather than extruding all of the strips which form the base and top wall layers, some may be preformed strips which are advanced through the corresponding apertures in the die. This would enable the base of the tubing to be constructed at least in part of materials that are not readily extruded, such as spun-bonded material, mesh, and the like. Analogously, this enables some of the layers in the laminated top wall to be formed of materials which are not readily extruded such as aluminum foil, fiber-reinforced plastic materials, and the like. The use of nonextruded strips of material for the laminar layers of the top wall is most readily employed when smooth-walled semiround tubing is to be manufactured.

Referring again to FIG. 3, the second step of the manufacturing process is continuously molding the rounded portion of the first and second generally D-shaped sleeves to shape the semiround top walls of the semiround tubing lengths. The molding is performed with a continuous blow molding means which comprises a plurality of pairs of mold blocks and pneumatic means for causing the plastic to contact the mold blocks. By way of explanation, adjacent the extrusion die 120 one pair 180A and 180B of the many pairs of mold blocks in the two continuous runs come together and abut. The mold blocks then move linearly away from the extrusion die at substantially the same rate as the polymeric material is extruded. Sufficient pneumatic pressure is introduced into the interior of each of the generally D-shaped sleeves by the pneumatic means including apertures 182A and 182B of the extrusion die to cause the soft plastic of the sleeves to conform with the interior surface of the mold blocks. The pneumatic means may further include nozzles connected with apertures 182A and 182B. As the mold blocks travel in contact with the composite structure, sufficient heat is lost from the plastic that the top wall portion retains the shape of the mold blocks. After the plastic has cooled to a generally semirigid stage, the mold blocks separate and return towards the extrusion die. Exiting from the mold blocks is a molded composite structure 184 comprises of a pair of semiround tubing lengths with molded top walls and with bases which abut the strip of adhesively non-compatible material.

Figure 5:
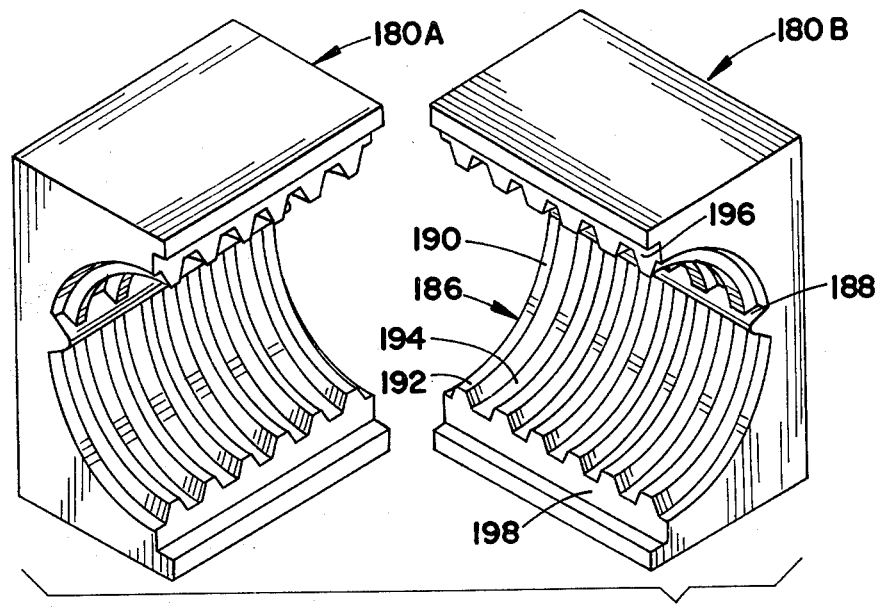
FIG. 5 is a perspective view of a pair of mold blocks from FIG. 3.

Looking now to FIG. 5, the mold blocks 180A and 180B are illustrated in greater detail. Because the mold blocks 180A and 180B are mirror images of each other, only mold block 180A is described in detail and it is understood that the description applies by analogy to mold block 180B and the other mold blocks. The mold block 180A has an inside surface 186 which matches the desired exterior configuration of the top wall of the tubing to be molded. The mold block has a longitudinally extending ridge 188 for forming the hinge means 18 at the apex area of the top wall. If the top wall of the tubing is to be corrugated, a plurality of alternating raised areas 192 and recessed areas 194 are disposed radially around the inside surface 186 of the mold block. Adjacent the abutting edges of the mold block are ledges 196 and 198 for forming the flanges 20 and 22 longitudinally along the terminal edge areas.

The mold blocks may take various alternate forms. For example, the blocks may be configured to form the semiround conduits top and bottom instead of side by side. As another alternative, the interior of the mold blocks may conform to the tubing in a folded or partially folded configuration. As yet another alternative, the mold blocks may be configured to form three or more top walls of the tubing structure at regular intervals circumferentially therearound. As yet another alternative, sets of more than two mold blocks may be used. Using a larger number of mold blocks may be particularly advantageous when more than two tubing structures are formed concurrently.

Figure 6:
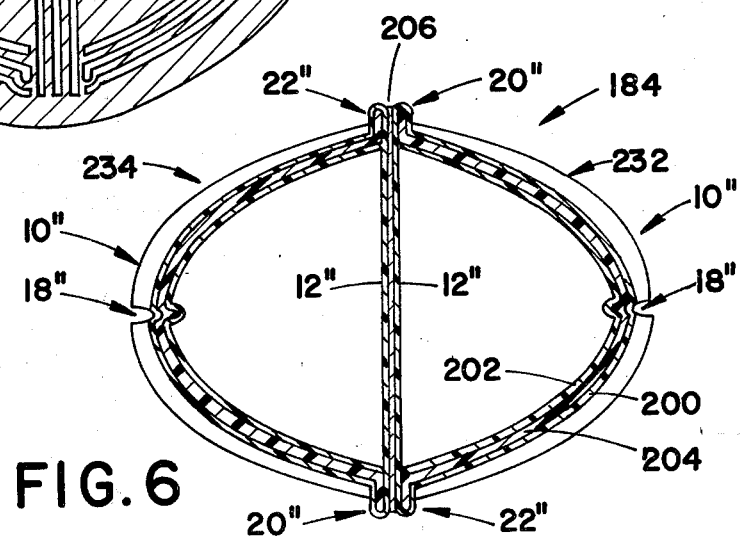
FIG. 6 illustrates two semiround tubing structures manufactured in accordance with the present invention separated by an adhesively non-compatible strip.

Looking now to FIG. 6, a cross section of the composite tubing structure 184 is illustrated. Like tubing parts to the tubing structure of FIG. 1 are marked with like reference numerals followed by a double prime ("). It will be appreciated that each of the pair of connected semiround tubing lengths are substantially identical. The composite tubing structure will, of course, vary with the exact tubing being formed. Each of the tubing lengths includes a molded top wall 10" which is formed of a plurality of layers. The layers include an outer layer 200, an inner layer 202, and a middle layer 204. Alternately, the top wall portion may be formed of as few as one layer or a larger plurality of layers. Between the bases 12" is a strip 206 of the adhesively non-compatible material.

Returning to FIG. 3, the next step is cooling the composite tubing structure 184 to bring the plastic materials to a more rigid state. A cooling means 220 removes heat from the composite structure. Numerous conventional cooling means may be used and are well known in the art, such as a spray of cool water and/or air.

The next step or means is separating means 230 for separating the composite tubing structure 184 into two semiround tubing lengths 232 and 234 and the strip 206 of adhesively non-compatible material. This is achieved by pulling the strip of adhesively non-compatible material and the first and second semiround tubing structures apart. For example, a pair of driven rollers may pull the non-compatible material from between the first and second tubing lengths as the tubing advances. Wedges or camming means may be used to assist moving the first and second tubing lengths apart. The strip of non-compatible material 206 is collected in a collector 236 so that it may be reprocessed and returned to the fourth resin hopper 116. After separating, the first and second tubing structures are further cooled by being immersed in a water bath 240. If the adhesively non-compatible strip is a liquid or solid which is water soluble, the separating step may separate the tubing lengths and the strip be removed or dissolved by the water bath 240.

Alternately, a preformed base can be bonded to the flanges 20 and 22 of the tubing length by heat sealing, sewing, gluing, stapling, or the like.

If the tubing is to be used for drainage, septic tubing, or other applications in which fluids are to flow in or out of the tubing, the next step is to perforate the base 12. A folding means 250 is used to fold the tubing lengths with their bases 12 outward. A perforating means 260 punches, cuts, melts or otherwise forms apertures in the exposed bases. Various perforating means may be used, such as a plurality of fingers shaped in conformity with the apertures 28 to be perforated into the bases may be arranged for repeatedly impacting upon the bases. The fingers may be disposed on a rotating wheel, a reciprocating ram, or the like. Alternately, the perforating means may perforate the base of the first and second tubing lengths with the tubing lengths in their unfolded configuration. This may be achieved by repeatedly contacting the base with a plurality of projections which are heated to a temperature sufficient to melt apertures in the base. As yet another alternative, sharp needlelike fingers may be disposed on a roller which rolls along the base perforating it with smaller diameter apertures.

Optionally, a layer of filtering material may be applied to the bases after they are perforated. The layer of filtering material may be fed along the base and attached to the flanges of the top wall by heat sealing, sewing, gluing, stapling, or the like.

The next step is to fold the tubing into the folded configuration shown in FIG. 2. A folding means 270 consists of a pair of sleeves 272 which are configured to match the exterior cross section of the tubing lengths. In the interior of the sleeve are tapered projections 274 and 276 for folding the base into the interior of the tubing. If the perforation step is performed on the tubing without first folding it, the receiving end of the sleeve 272 is shaped with a cross section that matches the tubing in its unfolded configuration. The sleeve tapers from the unfolded cross section at the receiving end to the folded cross section at the exit end.

The last step is to coil the folded tubing lengths. A pair of coiling means 280 and 282 wrap the folded tubing lengths onto spindles or wheels. In the preferred embodiment, the coiling means 280 and 282 rotate in opposite directions. Because the folded tubing structures are manufactured facing in opposite directions, coiling the folded tubing in opposite directions causes all coils to be coiled the same. After a preselected length of tubing is coiled, the tubing is cut and a new coil started. Alternately, the tubing may be cut in shorter lengths, such as 10 foot lengths, bundled and stacked.

Figure 7:
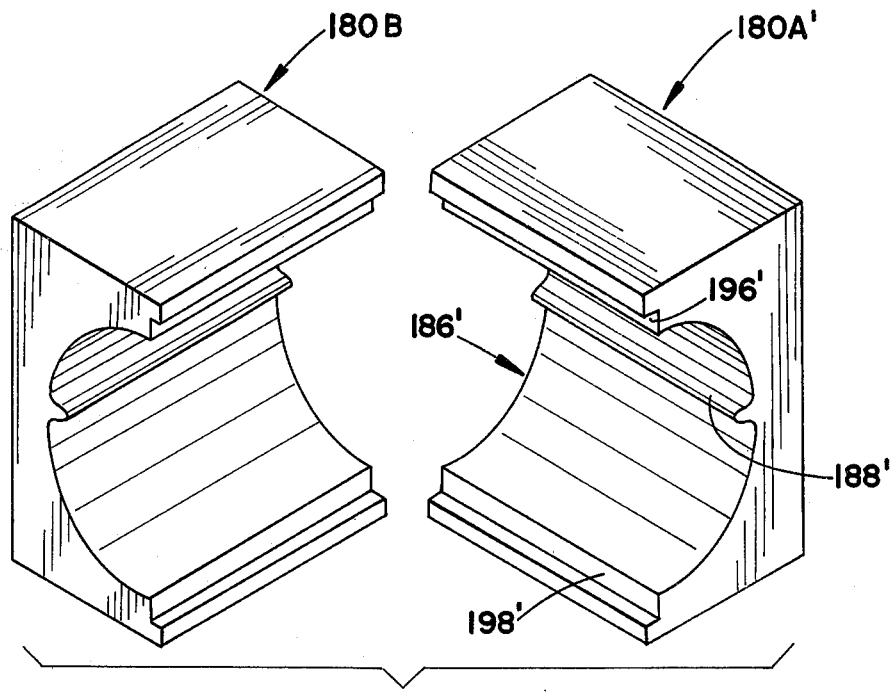
FIG. 7 is a perspective view of an alternate mold block construction.
Figure 8:
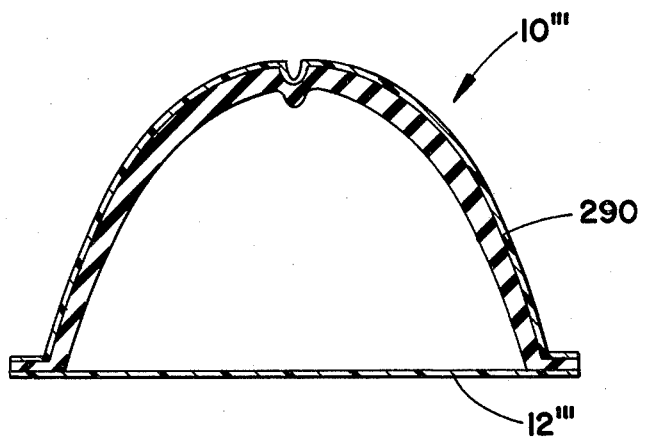
FIG. 8 illustrates a cross section of an alternate embodiment of tubing made with the mold block construction of FIG. 7.

Looking to FIGS. 7 and 8, there is shown an alternate construction for mold blocks and a cross section of smooth-walled semiround tubing which they produce. In the embodiment of FIG. 7, like reference numerals with the mold blocks of FIG. 5 are used for like parts followed with a prime '). The inside surface 186' of the mold block 180A' is a smooth surface with a generally semielliptical cross section. If folding tubing is desired, a ridge 188' is disposed longitudinally along the inside surface 186'. If nonfoldable tubing is desired, the ridge 186' is eliminated and the inside surface is uninterrupted.

FIG. 8 is a transverse cross section of smooth-walled tubing manufactured with the mold block of FIG. 7. Like parts of the tubing of FIG. 7 are numbered with the same reference numeral as like parts the tubing of FIG. 1 followed by a triple prime ('''). The top wall 10''' has a substantially semielliptical outer cross section or surface and a generally parabolic inner cross section or surface. The differences in the thicknesses of the top wall are caused by the rate of plastic extrusion around the aperture in the die. This rate is controlled by valving means in the tooling 124. The top wall is formed of expanded plastic material which is expanded to reduce its specific gravity by about 20-40%. The expansion is produced by adding an expansion agent, such as CELOGEN additive, to the plastic resin in the hopper. The CELOGEN additive forms small nitrogen bubbles in the plastic as it leaves the die. The base 12''' is formed of a nonexpanded polymeric material. Optionally, an outer layer of abrasion resistant polymeric material 290 may be bonded to the outer surface of the top wall to protect the expanded plastic. Preferably, the layer 290 is also light reflective. Alternately, the outer layer may be a nonpolymeric material such as aluminum foil, a painted or sprayed layer, or the like. Additional layers of lamination in the top wall may be provided. As alternatives, the base 12''' may be laminated, be the same expanded plastic as the top wall, be an expanded plastic which is sufficiently expanded to be porous, be integral with layer 290, be a non-extruded material, or the like.

The application has been described with reference to a preferred embodiment and several alternate embodiments. Clearly modifications, alternations, extensions, and various detailed implementations of some of the steps will occur to others upon reading and understanding the specification. It is our intention to include all such modifications, alterations, extensions, and further details insofar as they come within the scope of the appended claims or the equivalents thereof.

We claim:

1. The method for concurrently manufacturing at least two hollow tubing structures, which tubing structures each comprise a top wall and a generally flat base which is at least partially integral with the top wall, the method comprising:
   concurrently extruding at least a first pair of hollow sleeves formed at least partially of a first polymeric material;
   advancing a strip of a material which is adhesively non-compatible with the first polymeric material between and contacting the hollow sleeves during extrusion of the hollow sleeves; and
   separating the first and second hollow sleeves from the adhesively non-compatible strip.

2. The method as set forth in claim 1 wherein the advancing step comprises concurrently extruding the strip of the adhesively non-compatible material between the hollow sleeves.

3. The method as set forth in claim 2 wherein the step of extruding the first pair of hollow sleeves includes extruding a first pair of semiround strips of the first polymeric material and extruding a second air of semiround strips of a second polymeric material, each strip of the first polymeric material being extruded substantially parallel and contiguous with one of the strips of the second polymeric material, the second polymeric material being adhesively compatible with the first polymeric material such that the semiround strips of the first and second polymeric materials form the top walls of the hollow tubing structures, whereby the top walls are layered.

4. The method as set forth in claim 3 wherein said first polymeric material is an expanded plastic material.

5. A method for concurrently manufacturing at least two lengths of tubing, the method comprising:
   extruding a first pair of semiround strips of a first polymeric material;
   extruding a second pair of generally semiround strips of a second polymeric material substantially parallel and contiguous to the first pair of semiround strips, the first and second polymeric materials being adhesively compatible;

extruding a pair of generally flat generally linear strips adjacent the ends of the first and second pairs of semiround strips, such that the linear strips and the semiround strips taken together have generally back to back D-shaped cross sections, the linear strips being of a polymeric material which is adhesively compatible with at least one of the first and second polymeric materials;

advancing a material which is adhesively non-compatible with the linear strips between the linear strips;

continuously molding one of the semiround strips of each of the first and second pairs to form a first top wall of one of the lengths of tubing and continuously molding the other semiround strips of each pair to form a second top wall of the other length of tubing; and, separating the tubing lengths.

6. The method as set forth in claim 5 wherein the first and second polymeric materials are the same.

7. The method as set forth in claim 5 wherein said linear strips are formed of one of the first and second polymeric materials.

8. The method as set forth in claim 5 wherein the advancing step includes extruding a strip of material which is adhesively non-compatible with the first and second plastic materials between the pair of linear strips.

9. The method as set forth in claim 8 further including the step of perforating the linear strips whereby the bases of the tubing lengths are perforated.

10. The method as set forth in claim 8 further including the step of longitudinally folding the top wall of each tubing length with the base within.

11. The method as set forth in claim 10, further including the step of coiling the folded tubing lengths.

12. A method for manufacturing at least two tubing structures, the tubing structures each comprising a top wall and an attached base, the method comprising:

extruding a first pair of generally semiround strips of an expanded polymeric material;

concurrently extruding a first pair of generally linear strips of a nonexpanded polymeric material, the linear strips being disposed adjacent the semiround strips such that each substantially linear strip adheres to one of the semiround strips and that taken together they have a generally D-shaped cross section;

concurrently extruding a strip of material which is adhesively non-compatible with the non-expanded material between the linear strips;

continuously molding the first pair of semiround strips to form top walls of the tubing lengths; and, separating the tubing lengths.

13. The method as set forth in claim 12 further including the step of extruding a pair of semiround strips of nonexpanded plastic material, the non-expanded pair of semiround strips being extruded parallel and contiguous to the expanded pair of semiround strips, whereby the molding step molds the expanded and non-expanded semiround strips into layered top walls of the tubing lengths.

14. An apparatus for concurrently manufacturing at least two tubing structures, the tubing structures each comprising a top wall and a base which is integral with the top wall, the apparatus comprising:

a sleeve extrusion means for concurrently extruding at least first and second hollow sleeves which are formed at least in part of a first polymeric material and have at least one generally flat side;

advancing means for advancing a strip of a material which is adhesively non-compatible with the first polymeric material between the first and second sleeve generally flat sides; and separating means for separating the first and second hollow sleeves from the adhesively non-compatible strip.

15. An apparatus for concurrently manufacturing at least two hollow tubing structures, the tubing structures each comprising a top wall and a base which is integral with the top wall, the apparatus comprising:

a D-shaped sleeve extrusion means for concurrently extruding at least first and second generally D-shaped sleeves which are at least in part formed of a first polymeric material;

an adhesively non-compatible material extrusion means for extruding a strip of adhesively non-compatible material concurrently with the extrusion of the first and second D-shaped sleeves between the first and second D-shaped sleeves; and separating means for separting the first and second sleeves.

16. The apparatus as set forth in claim 15 wherein the D-shaped sleeve extrusion means includes a first extrusion means for extruding a first pair of semiround strips of the first polymeric material and a second extrusion means for extruding a second pair of semiround strips of a second polymeric material substantially contiguous with the first pair of semiround strips, the second polymeric material being adhesively compatible with the first polymeric material, such that the first and second pairs of semiround strips form rounded portions of the first and second D-shaped sleeves, whereby the D-shaped sleeves are at least partially layered.

17. The apparatus as set forth in claim 15 wherein the D-shaped sleeve extrusion means comprises plasticizing means for heating and pressurizing the first polymeric material to a plasticized state, channeling means for channeling the plasticized first polymeric material from the plasticizing means to a pair of substantially D-shaped apertures in an extrusion die.

18. The apparatus as set forth in claim 15 wherein the D-shaped sleeve extrusion means includes a base plasticizing means for heating and pressurizing a base polymeric material to a plasticized state, channeling means for channeling the plasticized base polymeric material from the base plasticizing means to a pair of substantially linear apertures in an extrusion die and a first plasticizing means for heating and pressurizing the first polymeric material to a plasticized state, channeling means for channeling the plasticized first polymeric material from the first plasticizing means to a pair of substantially semiround apertures in an extrusion die, such that the rounded portion of the D-shaped sleeves are made of the first polymeric material and the linear portions of the D-shaped sleeves are made of the base polymeric material.

19. The apparatus as set forth in claim 18 wherein the pair of substantially linear apertures in the extrusion die are substantially parallel and contiguous to the adhesively non-compatible material extruding means such that the D-shaped sleeves are extruded back to back with the strip of adhesively non-compatible material in between.

20. The apparatus as set forth in claim 14 further including molding means for continuously molding at least a part of the first and second sleeves, the molding means being disposed adjacent the first extrusion means.

21. The apparatus as set forth in claim 20 wherein the molding means includes a plurality of pairs of mold blocks and pneumatic means for causing at least a part of the first and second sleeves to conform to the mold blocks, each pair of mold blocks being adapted to abut together adjacent the sleeve extrusion means around the first and second sleeves, to travel away from the first extrusion means, and to separate away from the first and second sleeves.

22. The apparatus as set forth in claim 21 wherein each of said mold blocks has an internal molding surface which is adapted to receive a portion of one of the first and second sleeves and shape it into the top walls of one of the first and second tubing lengths, each of the internal molding surfaces having a generally semiround cross section and a longitudinal projection to form a hinge in an apex area of the top walls.

23. The apparatus as set forth in claim 22 wherein the molding surface of each of said mold blocks has a plurality of radial projections for forming corrugations in the top walls.

24. The apparatus as set forth in claim 16 further including a plurality of pairs of mold blocks and a pneumatic means, each mold block having an internal molding surface for shaping the top wall of one of the first and second tubing lengths, the pneumatic means causing a pressure differential which causes the first and second pairs of semiround strips to conform to the internal molding surface of the pair of mold blocks.

25. The apparatus as set forth in claim 24 further including cooling means for cooling at least the first and second D-shaped sleeves, the cooling means being disposed between the molding means and the separating means.

26. An apparatus for concurrently manufacturing at least two lengths of tubing, the apparatus comprising:
 first semiround strip extrusion means for extruding a first pair of generally semiround strips of a first polymeric material;
 a second semiround strip extrusion means for extruding a second pair of generally semiround strips of a second polymeric material, one strip each of the first and second pairs of semiround strips being extruded substantially parallel and contiguous to each other, the first and second polymeric materials being adhesively compatible;
 a base extrusion means for extruding a pair of generally linear strips of a base polymeric material, the linear strips being extruded substantially adjacent the ends of the first and second pairs of semiround strips such that taken together they have a generally D-shaped cross section;
 advancing means for advancing a strip of a material which is adhesively non-compatible with the base polymeric material between the pair of generally linear strips;
 molding means for continuously molding one strip each of the first and second pairs of semiround strips to form layered first and second top walls of the lengths of tubing; and
 separating means for separating the generally linear strips, whereby the two lengths of tubing are separated.

27. The apparatus as set forth in claim 26 wherein the molding means includes a plurality of pairs of mold blocks and a pneumatic means disposed adjacent the first and second extrusion means, each mold block having an internal molding surface for shaping the top wall of one of the semiround tubing lengths, the pneumatic means causing a pressure differential which causes the one strip of each of the first and second pairs of semiround strips to conform to the internal molding surface of one of the pairs of mold blocks and the other strip of each of the first and second pairs of semiround strips to conform to the internal molding surface of the other mold block of the pairs of mold blocks.

28. The apparatus as set forth in claim 27 wherein the advancing means includes adhesively non-compatible material extrusion means for extruding a generally linear strip of a polymeric material which is adhesively non-compatible with the first polymeric material between said pair of second linear strips.

29. The apparatus as set forth in claim 27 further including perforating means for perforating the bases of the first and second tubing lengths, the perforating means being disposed adjacent the separating means.

30. The apparatus as set forth in claim 27 wherein the internal surface of each of the mold blocks has a longitudinally extending projection for forming a hinge at an apex of each top wall whereby top walls are foldable.

31. The apparatus as set forth in claim 30 further including folding means for folding the top walls about the hinge.

32. The apparatus as set forth in claim 31 further including coiling means for coiling the folded first and second lengths of semiround tubing.

33. An apparatus for manufacturing at least two tubing structures, the tubing structures each comprising a top wall and an attached base, the apparatus comprising:
 a first extrusion means for extruding a first pair of semiround strips of an expanded, first polymeric material;
 a base extrusion means for extruding a pair of generally linear strips of a nonexpanded polymeric material, the linear strips being disposed adjacent the ends of the first pair of semiround strips such that taken together they have generally D-shaped cross sections;
 advancing means for advancing adhesively non-compatible material between the extruded linear strips;
 a plurality of pairs of mold blocks and a pneumatic means disposed adjacent the first and second extrusion means, each mold block having an internal molding surface for shaping one of the first pair of semiround strips into a top wall of one of the tubing lengths, the pneumatic means causing a pressure differential which causes the first pair of semiround strips to conform to the internal molding surface of the mold blocks and assists in causing contact between the first pair of semiround strips and the pair of linear strips to assist in bonding linear strips to form the attached bases of the tubing structures; and,
 separating means for separating at least one of the tubing structures from the adhesively non-compatible material.

34. The apparatus as set forth in claim 33 further including a second extrusion means for extruding a second pair of semiround strips of plastic material, the second pair of semiround strips being extruded parallel and contiguous to the first pair of semiround strips.

* * * * *